United States Patent [19]

Owen

[11] 4,083,636
[45] Apr. 11, 1978

[54] NAVIGATIONAL INSTRUMENT

[75] Inventor: William J. Owen, Littleton, Colo.

[73] Assignee: Martin Marietta Corporation, Rockville, Md.

[21] Appl. No.: 660,583

[22] Filed: Feb. 23, 1976

[51] Int. Cl.² .......................................... G01B 11/26
[52] U.S. Cl. ...................................... 356/141; 33/268; 250/203 R; 250/231 SE
[58] Field of Search ............................. 356/141, 152; 250/203 R, 231 SE; 33/268, 269

[56] References Cited

U.S. PATENT DOCUMENTS

| | | | |
|---|---|---|---|
| 2,758,377 | 8/1956 | Claret et al. | 356/141 |
| 3,001,289 | 9/1961 | Carbonara | 356/141 |
| 3,293,980 | 12/1966 | Benedetti | 356/141 |
| 3,448,272 | 6/1969 | Slater | 356/152 |
| 3,953,132 | 4/1976 | Michelson | 356/141 |

Primary Examiner—S. C. Buczinski
Attorney, Agent, or Firm—Sughrue, Rothwell, Mion, Zinn and Mac peack

[57] ABSTRACT

A navigational system for spacecraft use utilizes two telescopes gimbaled on a common axis to measure the scalar angle between a star and the lunar limb. The common axis is the axis of rotation of a momentum wheel carrying a narrow mirror. When each tracker is aligned at its respective target, the mirror passes through the respective optical axis of the telescopes. Timing sensors record the passage to measure the angle and its complement. The phase locked loop used to maintain precision angular rotational rates of the momentum wheel is disclosed such that approximately 20 statistical measurements of the included angle per second can be made.

11 Claims, 3 Drawing Figures

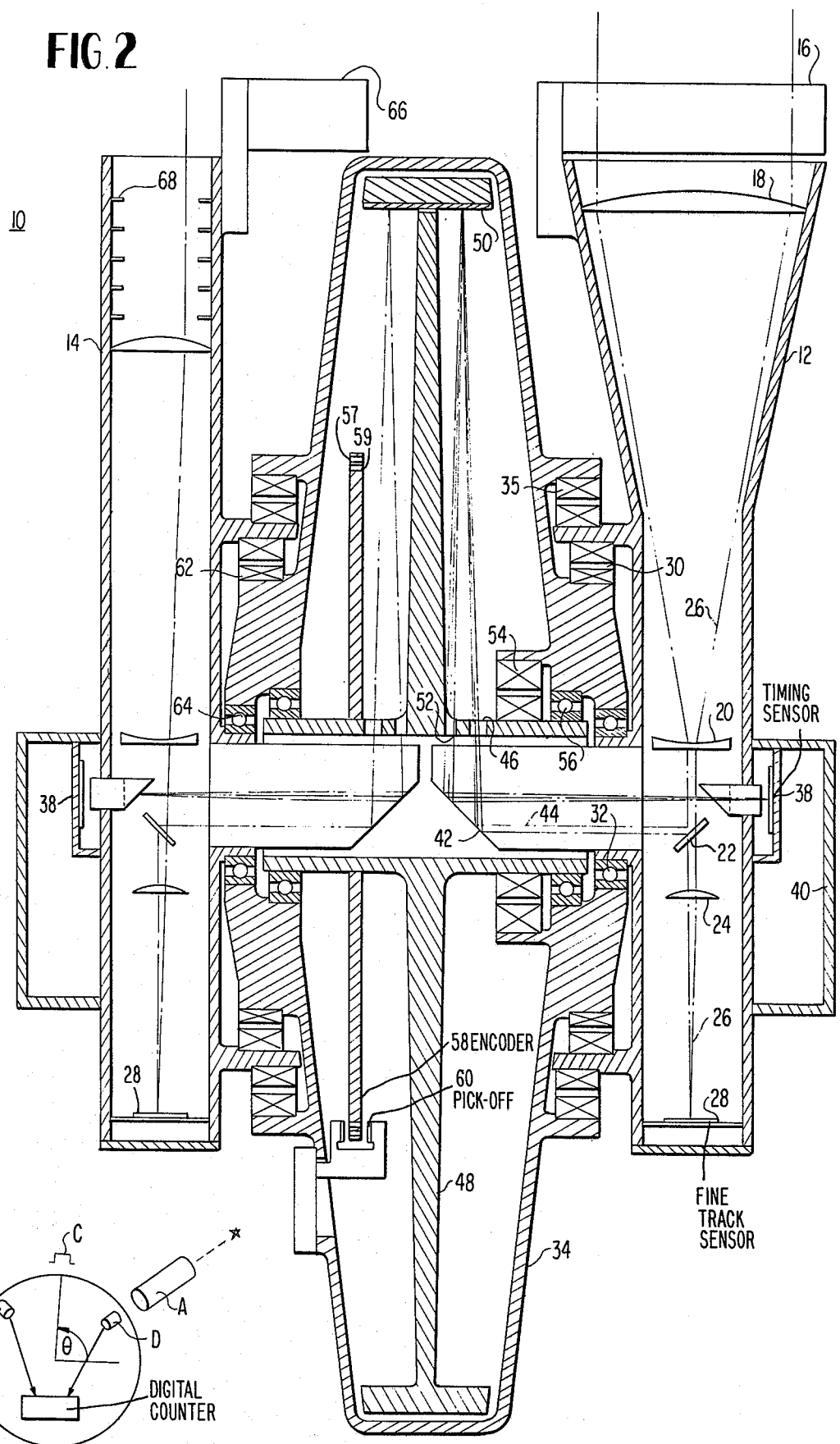
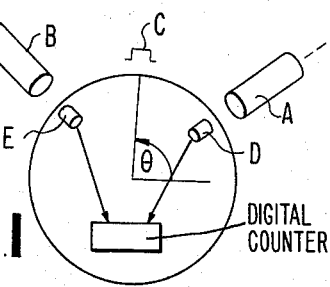

NAVIGATIONAL INSTRUMENT

BACKGROUND OF THE INVENTION

1. Field of the Invention

The present invention relates to a space navigation device usable as the prime navigation sensor for a completely autonomous spacecraft or satellite navigation system.

2. Prior Art

Systems for determining the angular position between a spacecraft and a source of radiation such as a distant star or other celestial body are known and have been used in a variety of applications. The particular choice of spacecraft navigation system is a function not only of the utility of the spacecraft, but also the type of stabilization system utilized on board the spacecraft. The type of sensors employed can generally be categorized into three broad groupings.

The first grouping comprises analog sensors comprising a pair of photo conductive devices connected as such that a differential output is derived from them. The differential output varies as a function of the projection angle of the vector of the radiation image on a planer surface formed by the photoconductive sensors. These devices, generally known as star trackers, utilize combinations of light baffles and sun shades to provide functions varying as a function of the angular position of the radiant emitting celestial body relative to the detector surface. In order to derive signals indicative of the angular position of the radiant source into two directions, orthogonal to each other, multiple sensors are required. Also, devices of this type require each of the photo conductive sensors to be very closely matched in order to maintain accuracy. The telescopes used in such star trackers are generally large and require extensive thermal and mechanical stability of the photo conductive devices to maintain accuracy and alignment. Also, the practical application of these devices for making the accurate determinations of angular position which are necessary can be obtained only if the field of view of the detector is relatively narrow, less than 10° of arc. Hence, detectors of the photo conductive type generally have an inherently slow response time, and their employment on spin-stabilized spacecraft cannot generally be effectuated. Therefore, the limitations of the use on this type of device as primary navigation sensors have generally been limited to either 3-axis stabilized or gravity gradient stabilized bodies, and in those cases, because of weight restraints, such star tracker devices have been used as a primary sensor, i.e., a lock-on device for a sole star. Also, a further problem inherent with the use of the photo-conductive type of devices of this group is that they cannot usually be employed with lens systems, so that measurements of celestial bodies having relatively low light emission, such as the moon and secondary level stars, are difficult.

A second general type of navigational sensor utilized for space navigation is the reticle time measuring system, and this type of device is applicable only to a spin-stabilized spacecraft. Spin-stabilized bodies generally spin at rates approximating 100 rpm and a reticle containing a pattern of slits is located in front of a photocell to provide radiation pulses from a celestial body on the photocell in response to the spin of the spacecraft. The time between detection of adjacent radiation pulses is measured to provide detected time between adjacent pulses to the stable spin period of the spacecraft. The use of analog controllers on the ground coupled with known orbits make this particular type of device relatively simple and inexpensive. However, practical experience has found that the accuracy thereof is limited only to measurements of approximately 1° of arc. Hence, for precision navigation, this type of device is generally unsatisfactory. A modification of the reticle time measuring system, employed for spinning spacecraft, is the digital reticle system. In this type of navigation device, a slit reticle is located in front of a binary or Gray-coded pattern of several photocell detectors. The position of the celestial body image is derived by the binary state of the several detectors in an image plane. For use in spinning vehicles, it is necessry to employ an auxiliary detector to indicate when radiation from the celestial body is in the sensor field of view. Also, to provide measurements of the body in two orthogonal directions, it is necessary to employ a pair of detectors. While digital reticle systems are inherently precise, their resolution is limited as a function of the spectral nature of the radiant energy derived from the body. Working experience with such devices has shown that radiation from the sun subtends an arc of 32 minutes (') which can be detected with the digital type device. If further refinement of the data is required to obtain accuracies, for example, to one arc minute, complex and expensive interpolation using computerized techniques are required. Also, inherent in such devices when utilized on spin-stabilized bodies is that measurements can be derived only once during each spin cycle, and, accordingly, the amount of information which may be derived with such devices is limited.

The patent literature is replete with a variety of attempts of the types mentioned above to achieve a practical and reliable navigation ystem. For example, a series of patents to Lillestrand, typified by U.S. Pat. No. 3,591,260, and patents to Aroyan et al, typified by U.S. Pat. No. 3,144,555, typify attempts to devise solutions using the reticle system, both in analog and digital contexts. Also, various patents have attempted to devise sextant arrangements which are roughly analogous to the optical star tracker type of devices employed in 2-axis stabilized bodies. As typified by the patent to Carbonara et al, U.S. Pat. No. 2,941,082, a sextant is shown which operates only in a gravitational field by measuring the angle between a heavenly body and a local gravity vector. Also, devices which are hybrids of various techniques are shown. Typical is the patent to Farthing et al., U.S. Pat. No., 3,744,913 which shows the measurement of the center of a radiation emitting celestial body utilizing a detector including four electrodes to determine the image of the body. This type of device is utilized on a spin-stabilized spacecraft primarily as a sun sensor.

SUMMARY OF THE INVENTION

The present invention is utilized as a high altitude autonomous navigation system for a spacecraft by utilizing a space sensor which measures the scalar angle between a navigation star and the lunar limb, or the lunar limb to an earth-fixed point source of light. In its broadest forms, the sensor consists of two telescopes gimbaled on a common axis of a momentum wheel. Each tracker is aligned to its respective target, and a very narrow mirror is rotated through an arc crossing each optical path of a respective tracker at a constant angular velocity. As the mirror passes through the optical axis of the first tracker, a timing sensor sees an impulse of light ($T_1$). As the mirror continues in its arc, it will pass through the optical axis of the second tracker, and at that instant, a second timing sensor will see an impulse ($T_2$). The scalar angle between the two collimated light sources is $T_1 = W(T_2-T_1)$. $T_1$ and $T_2$ are respectively the timing pulses used to start and stop a digital counter, as shown in FIG. 1 which counts a precision clock. The corresponding binary number represents the properly scaled scalar angle between the telescope optical axes. As the mirror continues its arc, it will again pass through the optical axis of the first tracker, at which instant the first timing sensor sees an impulse ($T_3$) and the complementary angle $T_2 = W(T_3-T_2)$. This complementary angle provides a second measurement of the included angle ($T_1$) for each revolution of the wheel. Typically, the mirror rotates at an angular velocity of approximately 60.6 radians/second, or 10 revolutions per second. At this angular velocity, 20 statistical measurements of the included angle per second can be made, and by the averaging of these samples, the removing of pointing servo-dynamic errors from the measurement can be accomplished. The light generated from the stars of the limb of the moon is utilized to produce the signal required for the time pulse generation.

Accordingly, it is an object of the present invention to provide a new and improved device for enabling the angular position between two sources of radiation to be ascertained.

Another object of this invention is to provide a space sextant for enabling the determination of the relative position between a moving spacecraft and two celestial bodies to be derived.

A further object of this invention is to provide a relatively inexpensive, yet highly accurate device for the determination of the position of two celestial bodies to be determined relative to a spacecraft.

Still a further object of this invention is to provide a high accuracy space navigation sextant utilizing radiation from a celestial body and a point source emanating on the surface of the earth.

These and still other objects and advantages of this invention will become apparent from consideration of the following detailed description of one specific embodiment thereof, especially when taken in conjunction with the accompanying drawings.

BRIEF DESCRIPTION OF THE DRAWINGS

FIG. 1 is a schematic diagram showing the wheel angle measurement system utilized in this invention.

FIG. 2 is a schematic diagram of the components of the space sextant.

DESCRIPTION OF THE PREFERRED EMBODIMENT

Figure 3:
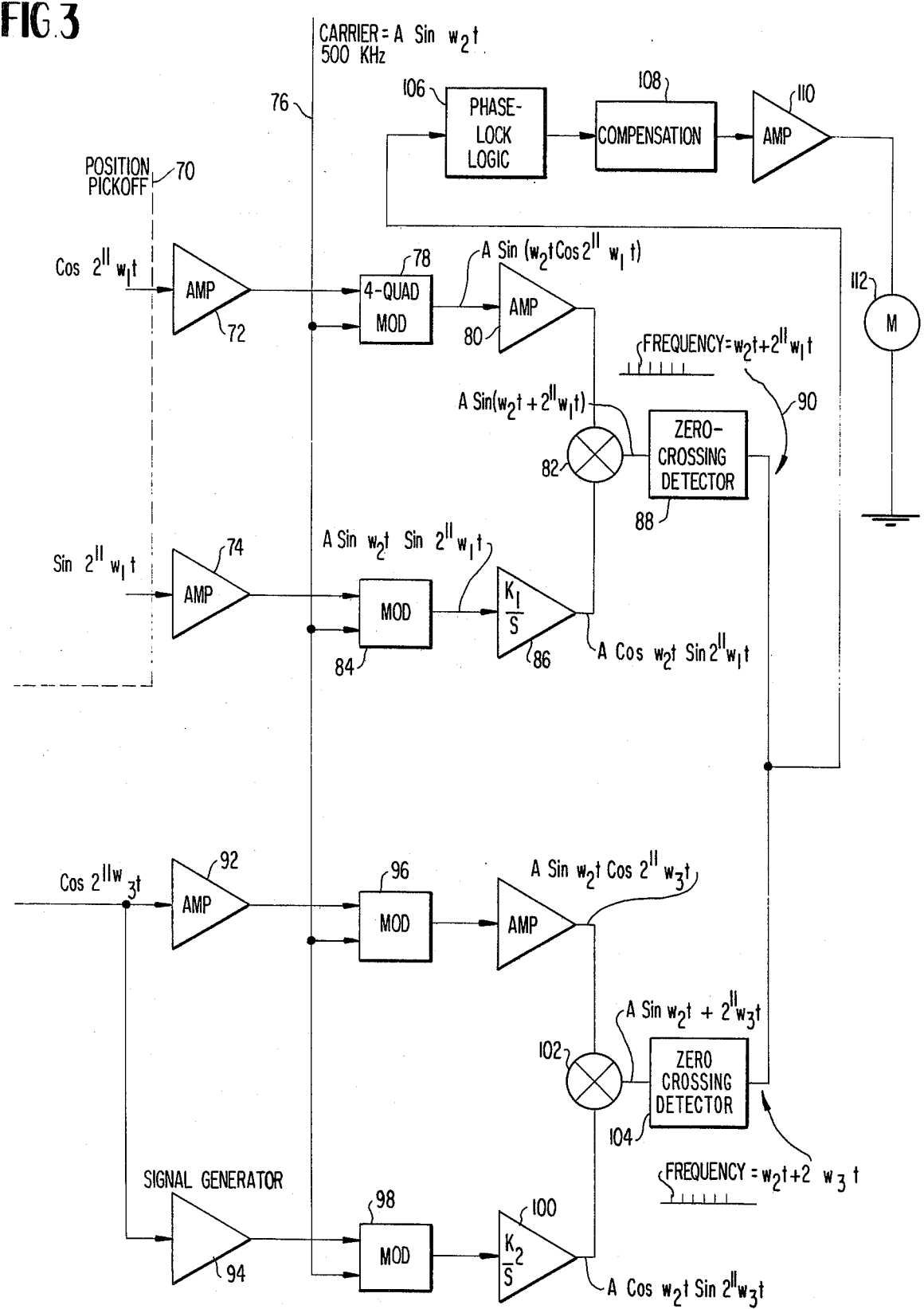
FIG. 3 is a schematic, functional block diagram of the phase-locked speed control loop.

Referring now to FIG. 1, there is shown a schematic diagram of the technique of measurement utilized in the present invention. In FIG. 1, it is assumed that the two trackers A and B are already aligned to their respective targets. It can be assumed, for the purposes of illustration, that tracker A is aligned to a distant star, while tracker B is aligned to the moon. A rotating window C is shown in FIG. 1, rotating at a constant velocity, and as the window passes through the optical axis of the tracker A, a timing sensor D will see an impulse of light denoted as $T_1$. As the window C continues through its arc of rotation, it will pass through the optical axis of tracker B, and at that time sensor E will see an impulse denoted as $T_2$. The included angle can be denoted as $\theta = W_1 t$, where $W_1$ is the angular rotation of the window. For this case, the included angle is then $\theta = W(T_2-T_1)$. $T_1$ and $T_2$ are respectively the timing pulses used to start and stop a digital counter, as shown in FIG. 1, which counts using a precision clock. The corresponding binary number represents the properly scaled angle between the telescope optical axes. As the window C continues through its arc, it will again pass through the optical axis of the tracker A, and at this point in time, the timing sensor D will see an impulse denoted as $T_3$. $\theta$, the complement of the included angle, could then be expressed as $W(T_3-T_2)$. This magnitude is therefore complemented on transfer to a computer to give a proper second measurement of the included angle.

With this measurement concept, it is apparent that each tracker, A and B must be gimbaled. Several fundamental factors in the selection of an optimum gimbal system, although not cruical to overall tracker accuracy, are base motion and attitude and position uncertainty. Secondary considerations such as power, size, weight, reliability, hardening and cost are factors that must be considered for any potential spacecraft utilization. Base motion, in the form of limit cycling caused by the craft attitude control loop deadband, must be isolated from the sextant trackers if it is significantly large. This limit cycle motion also directly affects the acquisition phase and/or the acquisition trackers field of view. Motion isolation could be achieved by inertial sensor stabilization, or, alternatively, by using two tracking sensors with each telescope servoed to its respective target to assure simultaneous angular measurements to a common reference. This invention involves a dual tracker system which utilizes one telescope for lunar limb tracking and the other telescope for star tracking. The invention as shown in FIG. 2 incorporates a single mirror on a spinning wheel between the telescopes and their associated gimbals.

Turning now to FIG. 2, a cross-section of the discrete time sharing concept portraying the optical paths, the wheel, bearings and sensors are shown. In FIG. 2, the tracker device, generally denoted as 10, has a telescope 12 and a second optical tracker 14. As previously indicated, this sextant may utilize one telescope, typically element 12, dedicated to star tracking (two magnitude or brighter) and a second telescope, generally 14, dedicated to limb tracking. However, it is readily apparent that both telescopes could be utilized for star tracking of individual stars.

The telescope 12 has a servo/shutter mechanism 16, shown in the "in" position, and the telescope utilizes a primary objective lens 18, a secondary lens 20, a beam splitter 22, and a lens 24. One optical path shown by the dotted line 26 is then through the objective lens 18, through concave focusing lens 20, through beam splitter 22 and focusing lens 24 on to a fine tracking 4-quadrant sensor 28. This path is used to develop the necessary pointing error signals for the respective in-plane and cross-plane pointing servos. A motor tracking drive, shown schematically at 30, is used to drive the telescope 12 into a tracking alignment with the respective star. Bearings 32 are disposed between the casing of the telescope 12, and a stationary case 34 to facilitate rotation of the telescope 12 about case 34. A tracker tachometer 36 is shown to pick off the speed of rotation of the tracking drive 30.

A second path to timing sensor 38, disposed within housing 40, is also shown in FIG. 2. In this second path, energy in a plane wave front enters through objective lens 18, passes through the secondary focusing lens 20, then to beam splitter 22, where it is deflected to a mirror 42. From the mirror 42, this second path, which is shown as 44, is completed by transmission through holes in the wheel axis 46, to the rim of the momentum wheel which is shown as 48. A narrow slit mirror 50 at the end of the momentum wheel 48 returns the transmitted energy instantaneously as the mirror moves through the optical axis, through a hole 52, reflected across mirror 42 and then to the timing sensor 38. As is readily apparent from FIG. 2, the optical axis is completed to the timing sensor 38 only when the slit mirror 50 passes through the optical axis of either telescope. The momentum wheel is driven by motor 54 and is journaled for rotation by bearings 56 about the stationary casing 34. Disposed for rotation with the momentum wheel 48 is a speed control pick-off which comprises an encoder section 58 and sensor 60. Such speed control encoders are well known in the art and need not be described in greater detail.

The operation of the second tracker 14 is identical to that of tracker 12, and comprises the same basic motor drive systems comprising drive motor 62 for tracker 14 by way of bearings 64. As shown in FIG. 2, a second tracker servo-shutter mechanism 66 is shown in the "out" position. Also, a series of light baffles 68 are shown in tracker 14 which is used for lunar limb sensing.

The momentum wheel 48 is driven at a constant inertial-angular velocity by means of motor 54. As described earlier, a timing signal is developed from each timing sensor as the slit mirror 50 moves through each optical axis, thereby providing a precise measure of the scalar angle between the two light sources. These timing pulses from each sensor are used to start and stop a digital counter which functions as a precision clock. The corresponding binary number represents the properly scaled, scalar angle between the telescope optical axes. As shown in the previous discussion, two angular measurements can be made for each revolution of the momentum wheel (the angle and its complement). A reasonable trade off between wheel angular velocity and clock frequency, which is related to angular resolution, establishes the angular velocity at approximately 60 radians/second; or 10 revolutions/second would yield 20 statistical measurements of angle/seconds.

Referring now to FIG. 3, a functional diagram of the phase locked speed control loop is shown. An essential element for the accurate scalar angle measurement is that W, the angular velocity of the momentum wheel 48, be a constant. By the use of known technology, for example, the development of a velocity/acceleration control loop for dual-spin, gas-bearing reaction wheels, indicates that a specification of $10^{-5}$ ft/lb/s momentum resolution placed on the control loop can be realized. As a consequence of such a requirement, the instantaneous wheel velocity would not deviate from a theoretical velocity by more than one part in $10^{-6}$. Difficulties in maintaining this limit, as a result of motor cogging torques and bearing frictional torques can be easily controlled by a wide band, closed loop servo, and unwanted reaction torques can be easily reduced to those caused by the wheel position pick-off 58 and 60. It can be shown that these torques are very systematic and consists of a fundamental frequency caused by a radial run-out of the pick-off 60, a second harmonic caused by the oblateness of the pick-off and two other harmonics, $2^{11}$ and $2^{12}$, of a fundamental frequency. The $2^{11}$ and $2^{12}$ harmonics do not cause any instantaneous position errors since they are high frequency (20 and 40 kHz) and are filtered (second-order) by the compensation of the control loop. Additionally, second-order mechanical filtering is achieved by the spinning momentum wheel 48. One example of a particular pick-off device which may be utilized in the fabrication of the system as shown in FIG. 2 would be an electro-optical disc manufactured by Teledyne-Gurley that has a reference mark and two tracks, a cosine track 57 and sine track 59, each being a function of $2^{11}\theta$ and $2^{11}(\theta + 90°)$.

As portrayed in FIG. 3, the phase locked loop is employed for velocity/acceleration control of the momentum wheel 48. At the pick off position, shown schematically as 70, which would be the point of the sensor 60 in the FIG. 2 embodiment, each of the two tracks, the cosine track 57 and the sine track 59, are shown as first being fed into an amplifier 72 for the cosine track and 74 for the sine track. A carrier frequency shown applied along line 76 of A $\sin\theta_2 t$ typically 500 kHz is modulated by the sine and cosine tracks to allow phase measurement of instantaneous wheel position at a high sample rate.

The modulation of the cosine track occurs as a consequence of the carrier frequency and cosine track input to a 4-quad modulator 78 with the modulated output processed through an amplifier 80 to adder 82. In a similar vein, the sine track is modulated at modulator 84 which receives inputs from the sine track through amplifier 74 and the carrier frequency across line 76 and is fed to amplifier 86 which performs a phase shift function of 90° before the signal is summed with the cosine modulated track at adder 82. The carrier frequency term $\theta_2$ appears in both inputs to the phase lock logic, and, consequently, its frequency instability does not affect the wheel velocity. Its only consequence is to affect the sample frequency, which is of no concern for extremely high sample rates. The function of the phase shifting of the sine modulated carrier is to reduce to a frequency consisting of the carrier plus that determined by the wheel angular velocity multiplied by $2^{11}$, a true suppressed carrier system when summed with the cosine modulated track. The resulting frequency is fed to a zero crossing detector 88, and the output, as shown schematically in FIG. 3 as indicated by the arrow 90, is a train of pulses that are phase compared with a frequency train of a frequency that represents the commanded angular velocity.

This pulse train is a result of the modulation of the commanded angular velocity component $\theta_3$ as a consequence of the operation of amplifier 92, signal generator 94, modulators 96 and 98, which modulate the commanded angular velocity components with the carrier frequency and the resulting phase shift from amplifier phase shifter 100 into adder 102. In a manner identical to the operation of the modulated reference tracks, a zero crossing detector 104 is employed, and the resultant output is fed to phase lock logic shown schematically as block 106. Within the phase lock logic, the output of the train of pulses from zero crossing detector 88 is compared with the pulse train of a frequency that represents the commanded angular velocity component from zero crossing detector 104. The phase error, following compensation through compensator 108, is applied to a high gain motor drive circuit consisting of amplifier 110 and motor 112.

The resulting overall loop gain is such that 30° of phase error causes saturation torque in the wheel drive motor. In such a servo loop, with extremely high gain, the resulting loop errors are quite systematic and are caused solely by characteristics with frequency components that fall within the band pass of the servo loop. As previously stated, these errors are caused by the physical characteristics of the pick-off disc and its mounting on the spin axis of the wheel (radial run-out), and therefor have long range repeatability.

The actual process of utilizing the output signals from the telescopes 12 and 14 and the associated detectors 38 would utilize simple logic to encode the included scalar angle. Scaling of clock frequency to the counter can be determined by a trade-off between the desired incremental $\theta$ bit rate and wheel speed as maintained by the phase locked speed control loop as shown in FIG. 3. If $2\pi$ radians are to be divided so that the smallest increment of angle is equal to 0.1 arc-second, approximately $1.3 \times 10^7$ increments must be counted per revolution. If the wheel were rotating with an angular velocity of 62.8 radians/second, the clock frequency would be approximately $1.3 \times 10^8$ Hz, which is not excessively fast for state of the art logic counters. The same logic which is used to digitize the included scalar angle can also be used to slew both trackers to their respective pointing angles, and, hence, can be used for acquisition. The function of the logic would perform under applicable computer control. A high speed parallel transfer clear would be necessary so both the angles and their complements can be transferred to the computer in a minimum time during the cycling of the unit.

It is readily apparent that other modifications and peripheral equipment may be used in the operational mode of the present invention. Such modifications and changes are well within the state of the art, and it is intended that the preferred embodiments disclosed herein will not be limited to the specific structures that were cited. The scope and breadth of the invention is to be determined from the appended claims.

1. A method of determining position fixes utilizing two optical receivers, comprising the steps of:
    a. positioning a first receiver on an axis of rotation into alignment with a first celestial body to receive radiation emitted therefrom;
    b. positioning a second receiver on said axis of rotation into alignment with a second celestial body to receive radiation emitted therefrom;
    c. developing a signal indicative of the scalar angle between the two optical receivers, said signal generated by measuring the time interval of constantly rotating means passing through the optical axis of said first receiver and then through the optical axis of said second receiver.

2. The method of claim 1 wherein the complement of the scalar angle between the two receivers is determined by measuring the time interval of rotation of said constant rotation means through the optical axis of said second receiver and then through the optical axis of said first receiver.

3. The method of claim 1 wherein said time interval is determined by starting a digital counter when said constant rotation means passes through the optical axis of said first receiver and stopping said counter when said constant rotation means passes through the optical axis of said second receiver.

4. The method of claim 2 wherein said time interval is determined by starting a digital counter when said constant rotation means passes through the optical axis of said second receiver and stopping said counter when said constant rotation means passes through the optical axis of said first receiver.

5. An apparatus for determining position by obtaining a plurality of celestial fixes comprising:
    a. rotating means carrying a mirror on a portion thereof;
    b. first and second optical means gimballed for movement on the axis of rotation of said rotating means and relative to said rotating means, said first optical means disposed to receive radiation emitted from a first celestial body and said second optical means disposed to receive radiation emitted from a second celestial body;
    c. a first timing sensor disposed relative to said first optical means, said first optical means having means to direct radiation received from said first celestial body along a first optical path such that when said mirror on said rotating means crosses said first path, radiation will be directed on to said first timing sensor;
    d. a second timing sensor disposed relative to said second optical means, said second optical means having means to direct radiation received from said second celestial body along a second optical path such that when said mirror on said rotating means crosses said second path, radiation will be directed on to said second timing sensor.

6. The apparatus of claim 5 wherein said rotating means is a momentum wheel rotating at constant speed and further including means to vary the rotational speed of said momentum wheel.

7. The apparatus of claim 6 further including an encoded disc rotating at the same speed as said momentum wheel, means to pick-off the code on said disc as it rotates, said code comprising a sine track and a cosine track and means responsive to said pick-off means to regulate the speed of said momentum wheel.

8. The apparatus of claim 7 wherein the means to regulate the speed of said momentum wheel includes a phase locked speed control loop coupled to said means to vary the rotational speed of said momentum wheel, said phase locked speed control loop having means to generate a carrier frequency, means to modulate said carrier frequency by said sine and cosine tracks respectively to allow phase measurement of the instantaneous position of said momentum wheel, means to sum said modulated signals, and comparator means to compare said summed signal with a signal representing the commanded angular velocity of said momentum wheel.

9. The apparatus of claim 5 wherein said first and second optical means comprise a pair of optical telescopes and further including means to rotate said telescopes about the axis of rotation of said rotating means.

10. The apparatus of claim 9 wherein said means to rotate said telescopes includes first motor means to rotate the first telescope and second motor means to rotate the second telescope independent of the rotation of said first telescope.

11. The apparatus of claim 10 further including first and second sensor means, each receiving emitted radiation from the respective celestial body each telescope is pointed at, each sensor developing pointing error signals to maintain said respective telescope aligned with the respective celestial body.

* * * * *